United States Patent
Mihály et al.

(10) Patent No.: US 10,482,507 B2
(45) Date of Patent: Nov. 19, 2019

(54) HANDLING DIGITAL ADVERTISEMENTS IN A COMMUNICATION NETWORK

(71) Applicant: Telefonaktiebolaget LM Ericsson (publ), Stockholm (SE)

(72) Inventors: Attila Mihály, Dunakeszi (HU); Lars Westberg, Enköping (SE); Gábor Molnár, Békésszentandrás (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 581 days.

(21) Appl. No.: 14/917,239

(22) PCT Filed: Sep. 18, 2013

(86) PCT No.: PCT/SE2013/051092
§ 371 (c)(1),
(2) Date: Mar. 7, 2016

(87) PCT Pub. No.: WO2015/041578
PCT Pub. Date: Mar. 26, 2015

(65) Prior Publication Data
US 2016/0217503 A1   Jul. 28, 2016

(51) Int. Cl.
*G06Q 30/02* (2012.01)
(52) U.S. Cl.
CPC ......... *G06Q 30/0277* (2013.01); *G06Q 30/02* (2013.01)
(58) Field of Classification Search
CPC .................. G06Q 30/0241; G06Q 30/0277
(Continued)

(56) References Cited

U.S. PATENT DOCUMENTS

| 2002/0103830 A1 | 8/2002 | Hamaide et al. |
| 2008/0083012 A1* | 4/2008 | Yu ............... G06F 21/50 726/1 |

(Continued)

FOREIGN PATENT DOCUMENTS

| EP | 1 591 922 A1 | 11/2005 |
| GB | 2 435 114 A | 8/2007 |

OTHER PUBLICATIONS

JavaScript, from Wikipedia, dated Sep. 17, 2013, downloaded Jul. 12, 2018 from https://en.wikipedia.org/w/index.php?title=JavaScript&oldid=573350648 (Year: 2013).*

(Continued)

*Primary Examiner* — Scott D Gartland
(74) *Attorney, Agent, or Firm* — Sage Patent Group

(57) ABSTRACT

There is provided a computer-implemented logic circuit, also referred to as ad-handling logic, configured to handle advertisements when a web page is downloaded from a web site or a web portal in a communication network. The computer-implemented logic unit comprises processing circuitry and associated memory. The processing circuitry is configured to identify an executable script related to an advertisement, also referred to as an ad script, in the web page code corresponding to the web page. The processing circuitry is further configured to insert an advertisement-delaying script-based executable patch in relation to the ad script to enable a delay of the download of objects related to the advertisement. As an example, the computer-implemented logic unit may be configured for connection to or implementation with a proxy server in the network.

24 Claims, 8 Drawing Sheets

(58) Field of Classification Search
USPC .............................................. 705/14.4, 14.73
See application file for complete search history.

(56) References Cited

U.S. PATENT DOCUMENTS

| | | | |
|---|---|---|---|
| 2009/0198580 A1 | 8/2009 | Broberg et al. | |
| 2009/0313318 A1* | 12/2009 | Dye ...................... | G06Q 30/00 709/202 |
| 2011/0153426 A1 | 6/2011 | Reddy et al. | |
| 2012/0143675 A1 | 6/2012 | Aviv et al. | |
| 2013/0060631 A1 | 3/2013 | Corson et al. | |
| 2013/0073374 A1 | 3/2013 | Heath | |
| 2013/0179767 A1 | 7/2013 | Bajric et al. | |
| 2014/0325343 A1* | 10/2014 | Rao ...................... | G06F 17/243 715/234 |

OTHER PUBLICATIONS

How Javascript Loading Works—DOMContentLoaded and OnLoad, from a.blog.about.code, dated Jun. 14, 2011, and downloaded Jul. 16, 2018 from https://ablogaboutcode.com/2011/06/14/how-javascript-loading-works-domcontentloaded-and-onload (Year: 2011).*

Legal ramifications of use of the JavaScript trademark?, specific author unknown, from Software Engineering Stack Exchange, dated Feb. 20, 2012, downloaded Jul. 12, 2018 from https://softwareengineering.stackexchange.com/questions/135905/legal-ramifications-of-use-of-the-javascript-trademark (Year: 2012).*

Screenshot of the Trademark Electronic Search System (TESS) from the USPTO, taken Jul. 16, 2018 from http://tmsearch.uspto.gov/bin/showfield?f=doc&state=4805:nakq4h.2.4 (Year: 2018).*

International Search Report, Application No. PCT/SE2013/051092, dated May 8, 2014.

Written Opinion of the International Searching Authority, Application No. PCT/SE2013/051092, dated May 8, 2014.

Anonymous, "Method and System for Performing on-the-fly Manipulation of Advertisements Based on Analyzing Content of Internet Traffic", ip.com, Aug. 16, 2010, 5 pp.

Gotoh et al., "A Method to Reduce Waiting Time for Continuous Media Data Broadcasting Considering Internet Advertisements", *The 8th International Conference on Advances in Mobile Computing & Multimedia (MoMM 2010)*, Paris, France, Nov. 8-10, 2010, pp. 132-139.

Kushmerick, "Learning to remove Internet advertisements", *Proceedings of the third annual conference on Autonomous Agents (AGENTS '99)*, Seattle, WA, May 1-5, 1999, pp. 175-181.

Seneviratne et al., "Reconciling Bitter Rivals: Towards Privacy-Aware and Bandwidth Efficient Mobile Ads Delivery Networks", *2013 Fifth International Conference on Communication Systems and Networks (COMSNETS)*, Bangalore, Jan. 7-10, 2013, 10 pp.

* cited by examiner

HANDLING DIGITAL ADVERTISEMENTS IN A COMMUNICATION NETWORK

CROSS REFERENCE TO RELATED APPLICATION

This application is a 35 U.S.C. § 371 national stage application of PCT International Application No. PCT/SE2013/051092, filed on Sep. 18, 2013, the disclosure and content of which is incorporated by reference herein in its entirety. The above-referenced PCT International Application was published in the English language as International Publication No. WO 2015/041578 A1 on Mar. 26, 2015.

TECHNICAL FIELD

The proposed technology generally relates to a method for handling advertisements when downloading a requested web page from a web site or a web portal in a communication network, a corresponding computer-implemented logic unit, a user equipment, and a proxy server as well as a computer program.

BACKGROUND

There is an ever-increasing demand for faster and better communication services and especially a need for improved quality of experience when downloading web content in a communication network.

For example, mobile communication becomes ubiquitous and besides telephony, mobile Internet traffic is continuously growing due to the technology that provides broadband data rates such as High Speed Downlink Packet Access, HSDPA, Enhanced Data rates for GSM Evolution, EDGE, and Long Term Evolution, LTE, on one hand and the growing number of mobile devices like tablets or smart phones that enable the usage of a tremendous number of Internet applications through the mobile access. Web browsing has been and remains a significant portion (around 30-40%) of the total mobile internet traffic. A known fact is that the users experience Quality of Experience, QoE, problems due to slow web page download times for mobile networks. The two main reasons for slower download performance compared to fixed broadband networks is the lower access rates and longer access latency. Thus, a number of solutions/technologies have been designed that can improve the performance for end-users for mobile networks. Some of them are based on server-related optimization, but most of them assume an intelligent proxy in the network.

The web optimization solutions may be grouped in two main categories: intrusive or non-intrusive. The former solutions are those that make modifications in the initial page. Such modifications may include:
  Removing or correcting non-relevant or wrong data in the markup language.
  In-lining all referred JavaScript and Cascading Style Sheets, CSS, files.
  Replacing Uniform Resource Locators, URLs, to large objects with other smaller, compressed objects.
  Filtering out advertisements.

The non-intrusive solutions are those that do not make modifications in the actual page. Thus a non-intrusive solution does not degrade the page quality in any way. Examples for non-intrusive web optimization solutions are:
  Compress the content.
  Cache the content at a proxy server.
  Pre-fetching some content to a local cache of a User Equipment, UE.

Advertisements seem to be representing one of the major problems for large web page downloads. This is partly because they cannot be cached; either because a server indication, or simply because they are not likely to be requested multiple times for the same user. Also, the structure of the advertisements is not optimized for short download times, containing a lot of local queries for client state and history, and actions based on those, resulting in large chains of request-reply patterns that cannot be parallelized. Reducing the time for ad downloads would generally result in a significant reduction of the overall web page downloads.

The simple non-intrusive methods like caching or content pre-fetching has turned out to have limited benefit due to the high share of dynamic content in the web pages. Advertisements, for example, are mostly dynamic and non-cacheable. The non-intrusive methods in general cannot solve the problem related to small access bandwidth.

The current intrusive methods are designed to decrease the data volume to be transferred and thus offer in principle a good solution for the bottleneck capacity problem. Filtering out ads at the proxy may be doable for example in the same way currently some browser plug-ins do it, i.e., based on some black-list that may be continuously updated based on observations. The proxy then would reply e.g., with a 'No content' reply to such requests. The impact on the downloaded page would be that some parts of the page would remain 'blank'. However, one problem with this ad filtering and other intrusive methods is the legacy impact. The subscribers will not get the same content as the one targeted by the portal owner which would jeopardize business expectations.

Reference [1] relates to distribution and targeting of advertising for mobile devices. Advertisements are selected according to user profiles and selected advertisements may be downloaded offline to mobile devices and stored. Content may be separately provided to the mobile device. Each content may be associated with a content header containing requirements or restrictions regarding the advertisement that may be shown in association with the selected content.

Reference [2] relates to on-the-fly manipulation of advertisements. The method involves analyzing the content of the traffic directed towards or away from a user, and manipulation of the advertisements displayed to the user. The manipulation includes removal of existing ads, addition of new ads, or replacing existing ads with new ads based on the analysis of the content of the traffic.

There is thus a general demand for an improved way of handling 'digital' advertisements in a communication network.

SUMMARY

It is an object to provide an improved method for handling advertisements when downloading a requested web page from a web site or a web portal in a communication network.

It is another object to provide a computer-implemented logic unit configured to handle advertisements.

Yet another object is to provide a user equipment configured to handle advertisements.

Still another object is to provide a proxy server configured to handle advertisements.

It is also an object to provide a corresponding computer program.

These and other objects are met by embodiments of the proposed technology.

According to a first aspect, there is provided a method for handling advertisements when downloading a requested web page from a web site or a web portal in a communication network. The method comprises the steps of identifying an executable script related to an advertisement, also referred to as an ad script, in the web page code corresponding to the web page, and inserting an advertisement-delaying script-based executable patch in relation to the ad script to enable a delay of the download of objects related to the advertisement.

According to a second aspect, there is provided a computer-implemented logic unit configured to handle advertisements when a web page is downloaded from a web site or a web portal in a communication network. The computer-implemented logic unit comprises processing circuitry and associated memory.

The processing circuitry is configured to identify an executable script related to an advertisement, also referred to as an ad script, in the web page code corresponding to the web page. The processing circuitry is further configured to insert an advertisement-delaying script-based executable patch in relation to the ad script to enable a delay of the download of objects related to the advertisement.

According to a third aspect, there is provided a user equipment configured to handle advertisements when downloading a requested web page from a web site or a web portal in a communication network. The user equipment comprises processing circuitry and associated memory. The processing circuitry is configured to identify an executable script related to an advertisement, also referred to as an ad script, in the web page code corresponding to the web page. The processing circuitry is configured to insert an advertisement-delaying script-based executable patch in relation to the ad script to enable a delay of the download of objects related to the advertisement. The processing circuitry is further configured to delay, when the patch is executed, the download of the objects related to the advertisement.

According to a fourth aspect, there is provided a proxy server configured to handle advertisements when a web page is downloaded from a web site or a web portal in a communication network. The proxy server comprises processing circuitry and associated memory. The processing circuitry is configured to identify an executable script related to an advertisement, also referred to as an ad script, in the web page code corresponding to the web page. The processing circuitry is configured to insert an advertisement-delaying script-based executable patch in relation to the ad script to enable a delay of the download of objects related to the advertisement.

According to a fifth aspect, there is provided an apparatus for handling advertisements when a web page is downloaded from a web site or a web portal in a communication network. The apparatus comprises an identifying module for identifying an executable script related to an advertisement, also referred to as an ad script, in the web page code corresponding to the web page. The apparatus also comprises an inserting module for inserting an advertisement-delaying script-based executable patch in relation to the ad script to enable a delay of the download of objects related to the advertisement.

According to a sixth aspect, there is provided a computer program comprising program code which, when executed by a computer, causes the computer to identify an executable script related to an advertisement, also referred to as an ad script, in the web page code corresponding to the web page. The computer program also comprises program code which, when executed by a computer, causes the computer to insert an advertisement-delaying script-based executable patch in relation to the ad script to enable a delay of the download of objects related to the advertisement.

In this way, it is possible to more efficiently handle 'digital' advertisements in a communication network. In particular, this allows a significant reduction of the download times of the useful, non-ad related, content of the web page with little processing effort. This means that the web browsing experience of the users will be greatly improved.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference numbers are used for similar or corresponding elements.

It would be desirable to provide a light-weight method for increasing user Quality-of-Experience, QoE, when downloading web pages. The inventors have recognized the possibility to make some modifications in relation to the ad scripts such that the advertisements are downloaded only after the most important content of the page from the viewing perspective has been downloaded. This may be achieved by identifying the ad script and inserting a script-based executable patch in relation to the ad script to enable a delay of the download of objects related to the advertisement.

A web page is a web document suitable for processing and rendering by a web browser. For example, the web browser displays the web page on a monitor. The web page is thus what is displayed or otherwise presented, but it also refers to the underlying web page code that defines the web page to be downloaded and viewed. When executed, the underlying web page code provides visible and/or audible content for presentation as a web page. The web page code is normally a main Hyper Text Markup Language, HTML, page, but can also refer to additional 'embedded' script files, which then are normally considered part of the overall web page code.

In other words, the web page code, also referred to as a web page code stream, is representative of the web page to be downloaded for rendering or presentation by the web browser.

Depending on the context, the expressions 'web page' and 'web page code' may sometimes be used interchangeably.

A scripting language or script language is a programming language that supports the writing of scripts, i.e. programs written for a special runtime environment that can interpret and automate the execution of tasks. An example is JavaScript.

Figure 1:
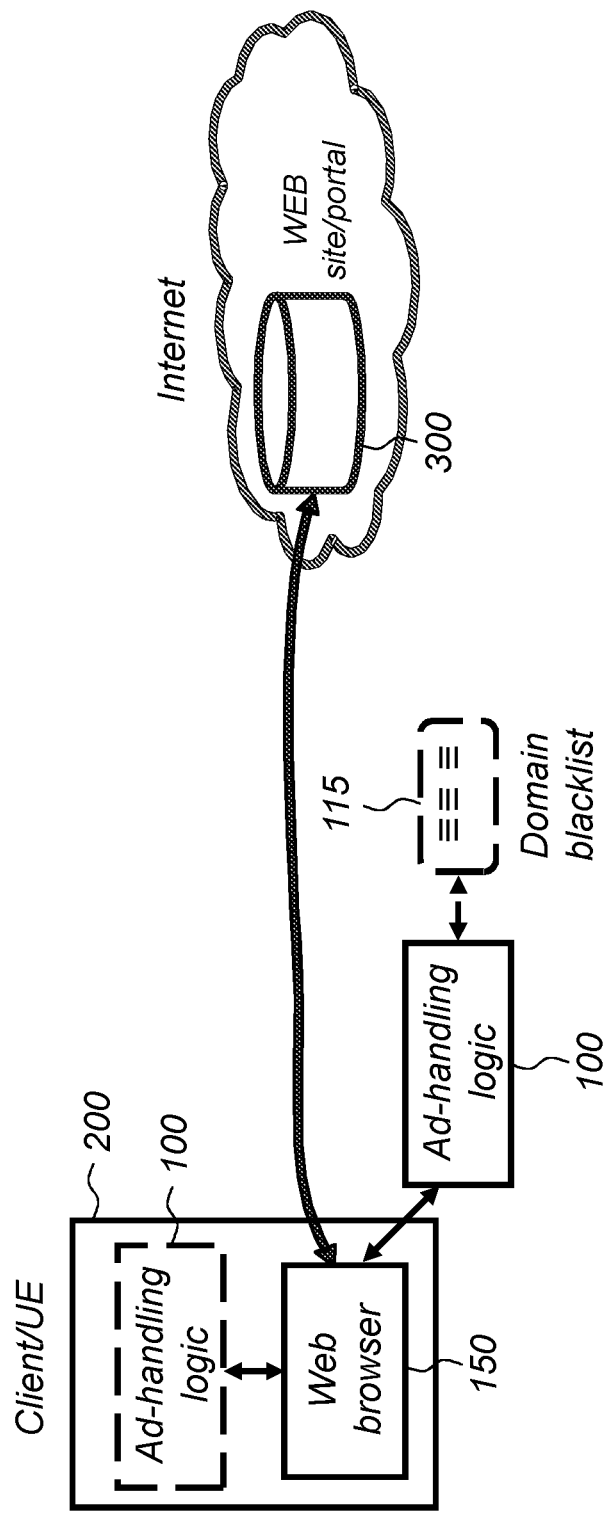
FIG. 1 is a schematic diagram illustrating examples of so-called ad-handling logic arranged on the client side according to an embodiment.
Figure 2:
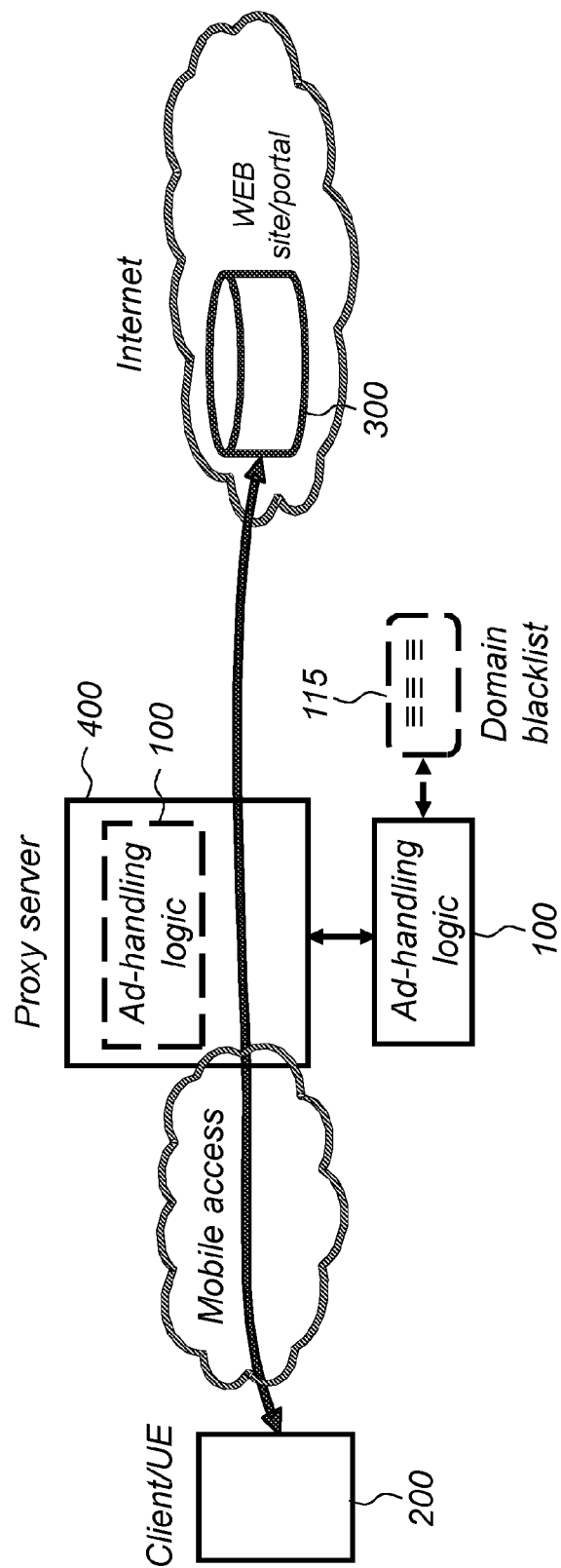
FIG. 2 is a schematic diagram illustrating examples of so-called ad-handling logic arranged on the proxy side according to an embodiment.

From an architectural point of view, there exist a plurality of potential realizations. For example, two different potential realizations of the proposed solution are shown in FIG. 1 and FIG. 2. A core component is a computer-implemented logic unit, referred to as the ad-handling logic 100. The ad-handling logic 100 is also referred to as a computer-implemented advertisement handler, or simply an ad handler.

FIG. 1 is a schematic diagram illustrating examples of the so-called ad-handling logic arranged on the client side according to an embodiment. In this example, the ad-handling logic 100 is implemented in relation to the client/UE 200; either in connection with the client/UE or integrated with the client/UE.

When the client/UE is sending a request for downloading a requested web page from a web site 300 or a web portal in the communication network, the ad-handling logic 100 may inspect the received web page code corresponding to the requested web page to identify the ad(s), and then make appropriate modifications in relation to the ad(s). The identification of the ad(s) may for example be based on access to a pre-configured domain blacklist 115.

As exemplified in FIG. 1, the ad-handling logic 100 may be connected to the local web-browser 150 executed in the client/UE 200. The ad-handling logic 100 may for example be implemented as an executable extension to the web browser. Alternatively, the ad-handling logic 100 is connected to the client 200.

FIG. 2 is a schematic diagram illustrating examples of so-called ad-handling logic arranged on the proxy side according to an embodiment. In this example, there is a transparent or non-transparent proxy server 400, also referred to as a web-proxy, in the network that may check the required pages. The ad-handling logic 100 is thus implemented in relation to the proxy server 400; either in connection with the proxy server or integrated with the proxy server. By way of example, the proxy server 400 may connect to the ad-handling logic 100 for identifying the advertisements and making the appropriate modifications to enable delayed ad delivery.

Figure 3:
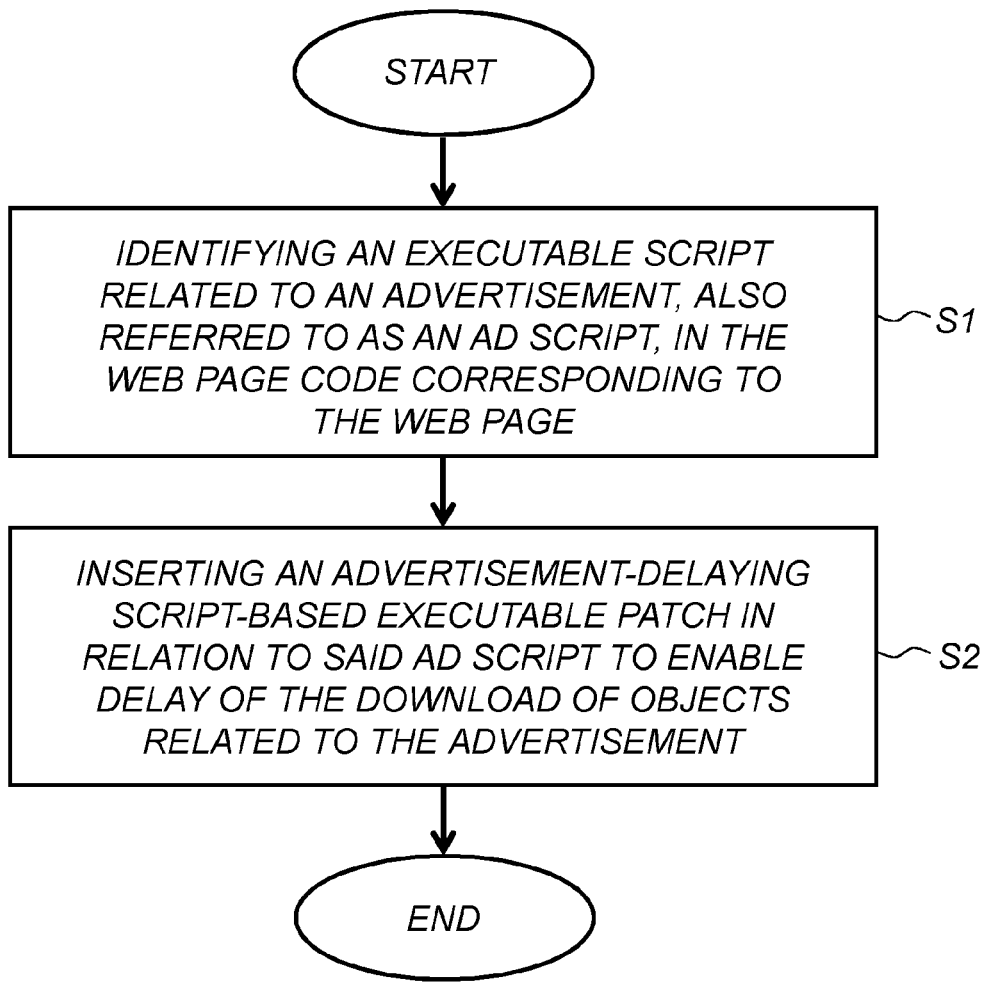
FIG. 3 is a schematic flow diagram illustrating an example of a method for handling advertisements when downloading a requested web page from a web site or a web portal in a communication network.

FIG. 3 is a schematic flow diagram illustrating an example of a method for handling advertisements when downloading a requested web page from a web site or a web portal in a communication network. In this example, the method comprises identifying (step S1) an executable script related to an advertisement, also referred to as an ad script, in the web page code corresponding to the web page, and inserting (step S2) an advertisement-delaying script-based executable patch in relation to the ad script to enable a delay of the download of objects related to the advertisement.

This allows a significant reduction of the download times of the useful, non-ad related, content of the web page with little processing effort, thus improving the web browsing experience of the users.

Typically, the advertisement-delaying script-based executable patch may be inserted in the main markup language file corresponding to the web page or inserted in the ad script. For example, the main markup language file, such as the main HTML page, may be modified by wrapping around the ad script with patch and unpatch logic of the script-based executable patch and inserting a script such as JavaScript defining the patch and unpatch logic in the main page. However, the main focus will primarily be on different embodiments that are based on inserting the script-based executable patch directly in the ad script.

The advertisement-delaying script-based executable patch is preferably configured to enable a delay of the download of objects related to the advertisement until after at least part of the other content of the requested web page has been downloaded.

By way of example, the advertisement-delaying script-based executable patch is typically configured to enable a delay of the download of objects related to the advertisement until after at least part of content considered useful from a user viewing perspective has been downloaded.

In a particular example, the advertisement-delaying script-based executable patch is configured to enable a delay of the download of objects related to the advertisement until after a specific event has occurred.

The specific event may for example be a 'load' event, or a customized event that is triggered when at least part of content considered useful from a user viewing perspective has been downloaded.

As an example, the advertisement-delaying script-based executable patch comprises a patching part that provides replacement functions for original built-in web-browser functions to enable the delay of the download of objects and an unpatching part that restores the original built-in web-browser functions.

Typically, the patching part includes definitions of the replacement functions and is inserted at the beginning of the ad script, and the unpatching part is inserted at the end of the ad script.

In a useful group of embodiments, the advertisement-delaying script-based executable patch is configured to modify an event subscription of the ad script.

For example, the advertisement-delaying script-based executable patch may be configured to modify the event subscription of at least one function, also referred to as event handler, of the ad script to a specific event. The function or functions is/are associated with the download of an object related to the advertisement.

In a specific example, the advertisement-delaying script-based executable patch is configured to change the event subscription from a 'DOMContentLoaded' event to an event after the 'DOMContentLoaded' event, as will be exemplified in detail later on.

It is also possible to configure the advertisement-delaying script-based executable patch to enable a delay of the download of objects related to the advertisement by temporarily removing at least one Uniform Resource Locator, URL, in the ad script that would result in download of an object related to the advertisement, and restoring this or these URL(s) after a specific event, as will be exemplified later on.

As an example, the above method for handling advertisements may be performed in connection with a web browser of a client in the communication network, as schematically illustrated in FIG. 1.

Alternatively, the above method for handling advertisements may be performed in connection with a proxy server in the communication network, as schematically illustrated in FIG. 2.

Initially, the client 200 or the intermediate proxy server 400 receives digital signals representing web page code corresponding to the requested web page for processing by the associated ad-handling logic unit 100. The web page code is at least temporarily stored or maintained in a memory that is accessible by the ad-handling logic unit 100 and the processing circuitry associated therewith.

The advertisement usually originates from a domain, here called an ad domain or an ad network, different than the web site or web portal 300 from which the web page is requested, whereas the useful, non-ad related content originates from the web site or web portal 300.

The method may be triggered on-demand, or applied for all web requests due to its light-weight nature. The proposed technology may be regarded as a generic method in that it may be applied for all browser and terminal types using the same process and parameters.

Another advantage is that, although being an intrusive solution, the method rather behaves as a non-intrusive solution since the proposed modification does not degrade the page quality in any way. In other words, experience of the user(s) regarding the received content quality is not degraded in any way. In addition, the solution does not pose any legal issues.

Once the script-based patch is executed the required delaying will be performed. For example, this may be take place in the local web browser 150 of the considered client 200. However, the general method performs the ad identification and patch insertion to enable the required delaying.

By way of example, the identification of the ad(s) may be based on a pre-configured domain blacklist 115, where domain name(s) in the ad scripts are compared to ad domains in the blacklist.

In particular, the proposed technology may be applicable for improving the web browsing experience on access networks with a bottleneck capacity, e.g. mobile broadband networks with limited access rates or high load.

In the following, the proposed technology for handling digital advertisements in a communication network to improve the QoE of users will be described with reference to particular non-limiting examples. Although any script language can be used, it is envisaged that the ad script and the advertisement-delaying script-based executable patch are normally based on JavaScript.

JavaScript, which is currently a trademark of Oracle Corporation, has become one of the most popular programming languages on the web. JavaScript typically relies on a run-time environment to provide objects and methods by which scripts can interact with the 'outside world'.

One of the most common uses of JavaScript is to write functions, which are embedded in Hyper Text Markup Language, HTML, pages and which interact with the Document Object Model, DOM.

JavaScript is primarily used as part a web browser, and enables programmatic access to computational objects within a host environment. Web browsers typically create 'host objects' to represent the DOM model in JavaScript. The web server is another common host environment. Today, JavaScript is a however considered to be a general purpose embedded language.

To insert a JavaScript into an HTML page, the <script> and </script> tags can be used. Often, it is desirable to execute the script code when an event occurs, like when a users clicks a button or similar. If the JavaScript code is defined in a function, the function can be called when the event occurs.

Figure 4:
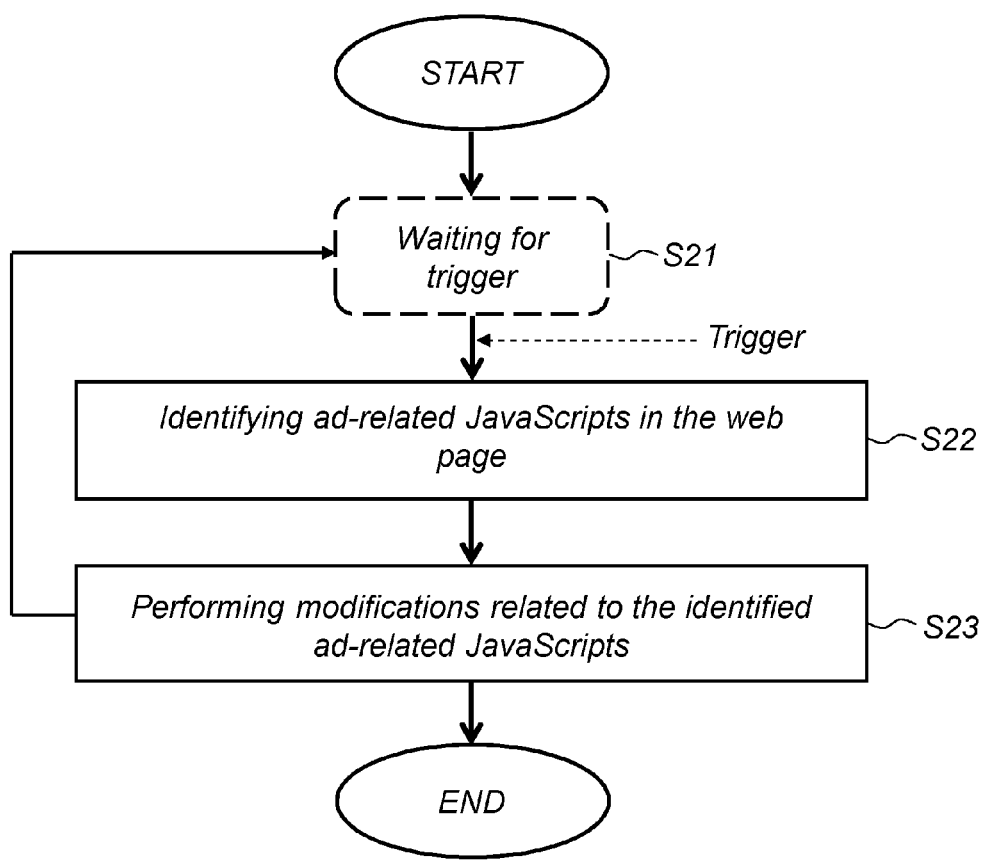
FIG. 4 is a schematic flow diagram illustrating a particular example of a method in the ad-handling logic according to another embodiment.

FIG. 4 is a schematic flow diagram illustrating a particular example of a method in the ad-handling logic according to another embodiment. This example, refers particularly to the case when the ad-handling logic is implemented in relation to a proxy server.

As previously mentioned, the method may be triggered on-demand, or applied for all web requests due to its light-weight nature. In the former case, the optional step S21 involves waiting for a trigger. A page modification trigger may come from the proxy server in the case the proxy server identifies that a certain page has to be modified. Reasons for modifications could be user policies, current network conditions, and a page that has not been modified recently; a recently modified page may be re-used for other user requests. The proxy server may also indicate which page should be modified. Note however, that due to the light-weight nature of the method, the ad-handling logic could in principle be applied or switched on for all web requests.

In step S22 the scripts that relate to the advertisements are identified. This may be performed, e.g. based on a blacklist of advertisement domains that may be continuously updated.

In step S23, if the domain is identified as an ad domain, then some modification is performed related to the corresponding script.

A main observation related to the ad scripts is that the ad content (images, HTML code) is either inserted with 'document.write' when the advertisement script is loaded, or postponed to after the DOMContentLoaded event and is inserted using DOM manipulation techniques. The advantage of the former is simplicity in most cases. There are a number of reasons why the latter is also used:

Flexibility: on a complete DOM model it becomes much easier to perform any modifications at any time.

Stability: if a third party script would execute anything on an incomplete DOM model this could cause unwanted events Context-awareness: easy to align the ad with the environment.

In both cases the result is that the advertisements may delay the download and presentation of other, useful content. For example, the DOMContentLoaded event generally triggers also a large number of other scripts and downloads. As a result, the advertisement script execution and subsequent ad content downloads will compete on client and transport resources with other non-ad-related content that will be referred to as 'useful content'.

The delaying method to be used depends on whether the ad-related content is postponed to after the DOMContent-Loaded event or inserted with document.write. Examples of two possible alternatives are outlined in the following.

Postponing the ad-related content download may be achieved by re-subscribing the corresponding ad scripts to after the DOMContentLoaded event and thus all subsequent ad downloads will be performed after this event. The method proposed here is that, instead of the DOMContentLoaded event, replace the subscription of the ad scripts to after some other event. This may be for example the 'load' event, which ensures that all the useful content has been downloaded. Another possibility is to inline a script that creates an additional event. For example, the script would monitor when the main article or the useful content related to the currently visible part of the page has been downloaded and triggers an event afterwards. The advantage of the latter is that no specific knowledge of the web-page is required; similar mechanisms are implemented in some fashionable web pages like YouTube that download the content only when it would become visible when the user scrolls down on page.

Ad content downloaded with document.write can be found in ad-related scripts that are also inserted using document.write or with a regular <script> tag in the HTML code. Note that these ad-related script tags, e.g. in the form of document.write ('<script src="http:// . . . "></script>') should not be delayed themselves, since the caller of the document.write function may assume that the injected script was downloaded and executed successfully after the document.write call returns. Thus, an example method proposed for ad content using document.write is that, in the case when URLs are found in document.write function calls that would result in injecting other objects (e.g. pictures or iframes), then first remove those URLs (e.g. inject an empty image of iframe), and restore the URLs after some event as described before. This is made possible by the fact that these objects are always downloaded later anyway, so the caller may not assume that these are already loaded when the document.write function call returns.

The ad-handling logic, also referred to as delay logic or an ad handler, and generally embodied as a computer-implemented logic unit, may for example implement one or both of the above two alternatives.

The ad-handling logic can be implemented as group of small 'replacement functions' for certain built-in functions of the browser. These 'replacement functions' usually modify the arguments of the function calls before forwarding them to the original built-in functions and in some cases contain additional logic.

The process of installing the replacement functions will be referred to as patching and the restoration of the original functions as unpatching. Each advertisement script normally needs to be preceded by a patch operation and to be followed by an unpatch operation.

An example of built-in methods that can be patched:
document.write
document.addEventListener In general, when an event occurs on a target element, e.g. a button click, a form submit or the like, a handler function is executed. The addEventListener is a method that registers an event handler function (i.e. an event listener) for a specified event on the currently considered object.

An example of meta-level pseudo-code is shown below.

```
function newAddEventListener(event, event_handler)
    if event == 'DOMContentLoaded'
        // Registering the event handler for the 'load' event
        // instead of the 'DOMContentLoaded' event
        window.addEventListener('load', event_handler)
    else
        // Simply forwarding the subscription request
        document.originalAddEventListener(event, event_handler)
function newDocumentWrite(string)
if (string matches '<img|iframe ...src="originalURL" ... >')
    // Removing the url and then restoring after 'load'
    string = '<img|iframe ... id="delayed"src="" ... >'
    window.addEventListener(
    'load',
    document.getElementById('delayed').src = originalURL
    )
document.originalWrite(string)
function patch( )
```

```
document.originalWrite = document.write
document.write = newDocumentWrite
    document.originalAddEventListener = document.addEventListener
    document.addEventListener = newAddEventListener
function unpatch( )
document.write = document.originalWrite
    document.addEventListener = document.originalAddEventListener
```

An example of pseudo-code for how to perform modifications to the identified ad-related JavaScript files is illustrated below. Both the function definitions and the patch are inserted at the beginning of the JavaScript file, while the unpatch code is inserted at the end. Note that, in this way, both alternatives of ad insertion may be handled by a common method.

```
// Definition of patch( ), unpatch( ), newAddEventLister( ) and
newDocumentWrite( )
functionnewAddEventListener(event, event_handler)
...
// Execution of the patch logic
patch( )
// The original advertisement JavaScript code is here
...
// Execution of the unpatch logic
unpatch( )
```

It will be appreciated that the methods and devices described above can be combined and re-arranged in a variety of ways.

For example, embodiments may be implemented in hardware, or in software for execution by suitable processing circuitry.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits, ASICs.

Alternatively, at least some of the steps, functions, procedures, modules and/or blocks described above may be implemented in software such as a computer program for execution by suitable processing circuitry including one or more processors.

The flow diagram or diagrams presented above may therefore be regarded as a computer flow diagram or diagrams, when performed by one or more processors. A corresponding apparatus is defined as a group of function modules, where each step performed by the processor corresponds to a function module, as will be exemplified later on.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The relevant network nodes, such as the UE and proxy server, may also include suitable communication circuitry for communication with one or more other nodes, including transmitting and/or receiving information.

Figure 5:
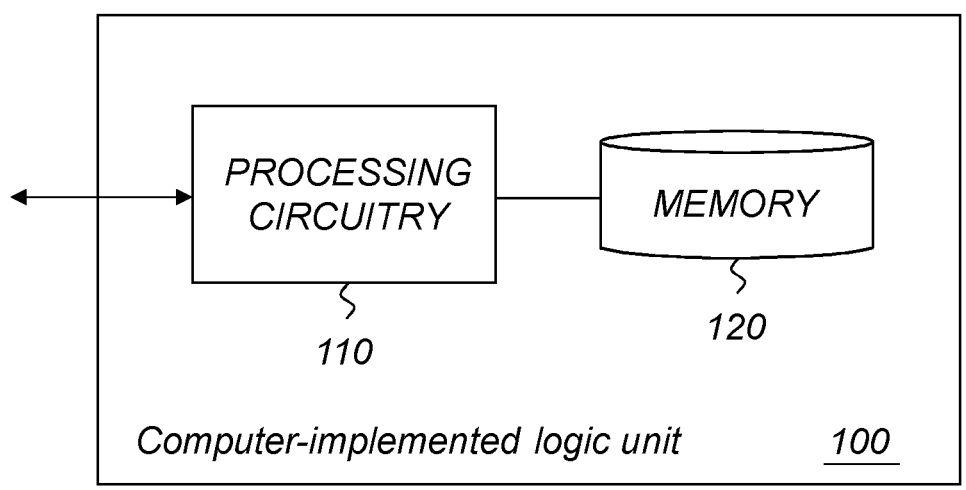
FIG. 5 is a schematic block diagram illustrating an example of a computer-implemented logic unit according to an embodiment.

FIG. 5 is a schematic block diagram illustrating an example of a computer-implemented logic unit configured to handle advertisements when a web page is downloaded from a web site or a web portal in a communication network according to an embodiment.

In this example, the computer-implemented logic unit 100, also referred to as a computer implemented ad handler, comprises processing circuitry 110 and associated memory 120. The processing circuitry 110 is configured to identify an executable script related to an advertisement, also referred to as an ad script, in the web page code corresponding to the web page. The processing circuitry 110 is also configured to insert an advertisement-delaying script-based executable patch in relation to the ad script to enable a delay of the download of objects related to the advertisement. As mentioned, the processing circuitry 110 may include one or more processors or equivalent processing unit(s).

By way of example, the processing circuitry 110 may be configured to insert the advertisement-delaying script-based executable patch in the main markup language file corresponding to the web page or in the ad script.

Typically, the processing circuitry 110 is capable of receiving/reading the web page code corresponding to the web page, make the necessary modifications and output modified web page code; in the main page and/or the relevant script file(s).

The processing circuitry 110 may for example be configured to insert the advertisement-delaying script-based executable patch in the form of a patching part that provides replacement functions for original built-in web-browser functions to enable the delay of the download of objects and an unpatching part that restores the original built-in web-browser functions, and configured to insert the patching part including definitions of the replacement functions at the beginning of the ad script, and configured to insert the unpatching part at the end of the ad script.

In a particular example, the processing circuitry 110 is configured to insert the advertisement-delaying script-based executable patch to enable a delay of the download of objects related to the advertisement until after at least part of the other content of the requested web page has been downloaded or until after a specific event has occurred.

The processing circuitry 110 may also be configured to insert the advertisement-delaying script-based executable patch to modify an event subscription of the ad script, for example as previously described.

As previously explained, the computer-implemented logic unit 100 may be configured for connection to or implementation with a web-browser of a client such as a UE in the communication network. Alternatively, the computer-implemented logic unit 100 may be configured for connection to or implementation with a proxy server in the communication network.

By way of example, the processing circuitry 110 comprises a processor, and the memory 120 comprises instructions executable by the processor.

The computer-implemented logic unit may be regarded as an apparatus, which is defined as a group of function modules, where each step performed by the processing circuitry 110 corresponds to a function module. In this example, the apparatus comprises an identification module for identifying an ad script in the web page code corresponding to the web page, and an insertion module for inserting an advertisement-delaying script-based executable patch in relation to the ad script to enable the desired delay. In this case, the function modules are implemented as a computer program running on the processor.

As used herein, the term UE should be interpreted as a non-limiting term, including a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term UE comprises at least devices equipped with radio circuitry for wireless communication according to any relevant communication standard.

Figure 6:
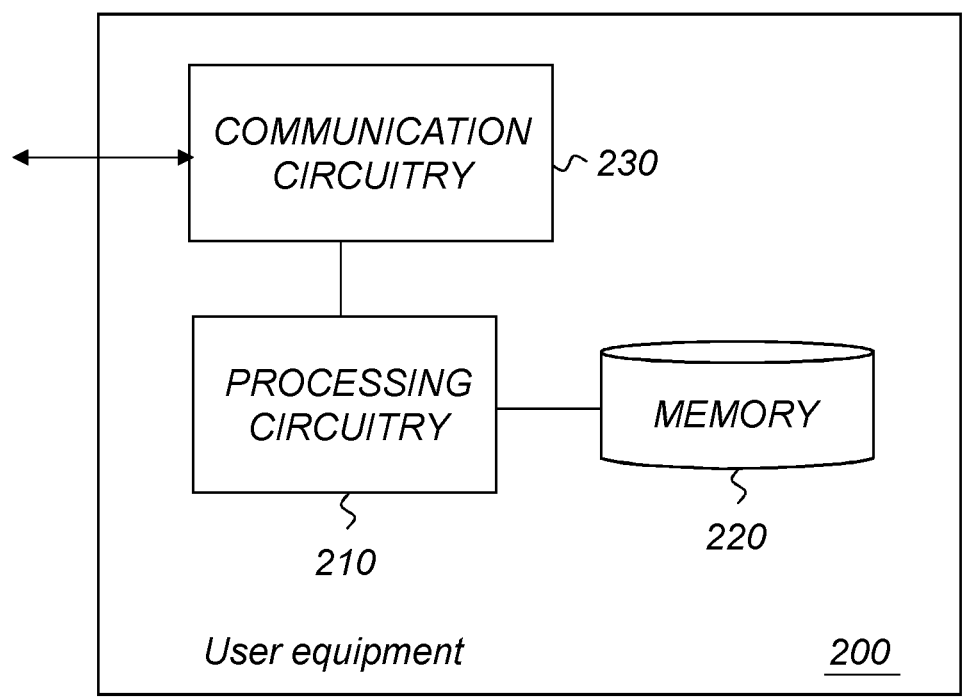
FIG. 6 is a schematic block diagram illustrating an example of a user equipment according to an embodiment.

FIG. 6 is a schematic block diagram illustrating an example of a user equipment according to an embodiment. In this example, the ad-handling logic is basically integrated into the user equipment, UE, so that the UE is configured to handle advertisements when downloading a requested web page from a web site or a web portal in a communication network. The UE 200 basically comprises processing circuitry 210 and associated memory 220, and optional communication circuitry 230.

The processing circuitry 210 is configured to identify an executable script related to an advertisement, also referred to as an ad script, in the web page code corresponding to the web page. The processing circuitry 210 is also configured to insert an advertisement-delaying script-based executable patch in relation to the ad script to enable a delay of the download of objects related to the advertisement. For the UE case, the processing circuitry 210 is further configured to delay, when the patch is executed, the download of the objects related to the advertisement.

By way of example, the processing circuitry 210 comprises a processor, and the memory 220 comprises instructions executable by the processor.

As previously indicated, the UE may provide a suitable run-time environment, such as a web browser, and the ad-handling logic may be executed as an extension to the web browser.

The communication circuitry 230 may include functions for wired and/or wireless communication with other devices and/or network nodes in the network.

Figure 7:
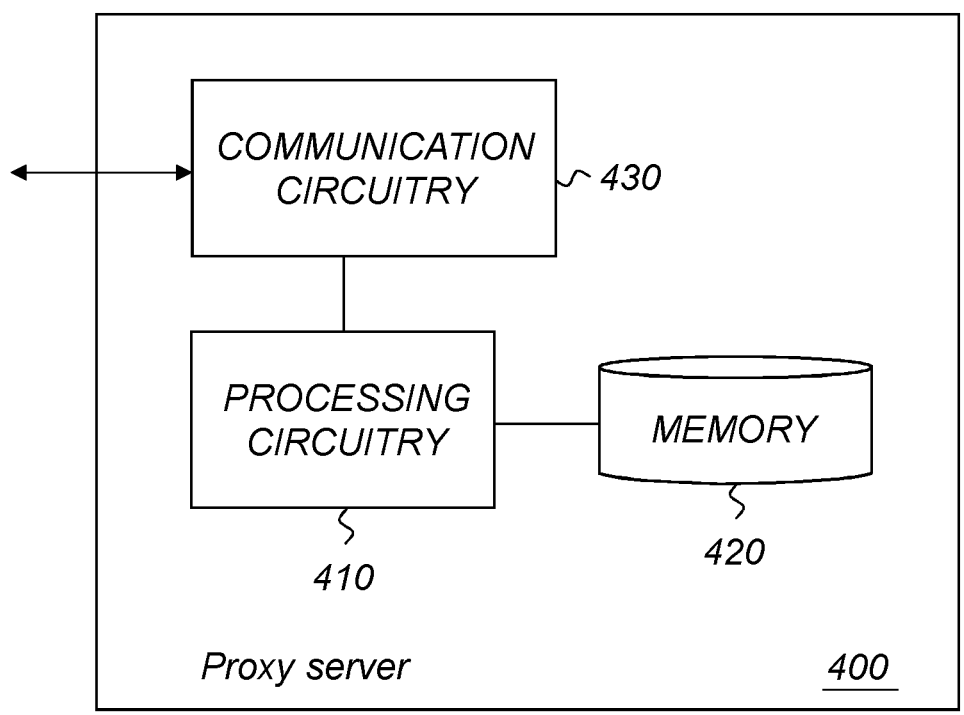
FIG. 7 is a schematic block diagram illustrating an example of a proxy server according to an embodiment.

FIG. 7 is a schematic block diagram illustrating an example of a proxy server according to an embodiment. In this example, the ad-handling logic is basically integrated into the proxy server 400 so that the proxy server is configured to handle advertisements when downloading a requested web page from a web site or a web portal in a communication network. The proxy server 400 basically comprises processing circuitry 410 and associated memory 420, and optional communication circuitry 430.

The processing circuitry 410 is configured to identify an executable script related to an advertisement, also referred to as an ad script, in the web page code corresponding to the web page. The processing circuitry 410 is also configured to insert an advertisement-delaying script-based executable patch in relation to the ad script to enable a delay of the download of objects related to the advertisement.

By way of example, the processing circuitry 410 comprises a processor, and the memory 420 comprises instructions executable by the processor.

The communication circuitry 430 may include functions for wired and/or wireless communication with other devices and/or network nodes in the network.

The processing circuitry 410 of the proxy server is typically capable of receiving/reading the web page code corresponding to the web page, make the necessary modifications and output modified web page code; in the main page and/or the relevant script file(s). The modified web page code can then be communicated via the communication circuitry 410 to the client/UE for subsequent execution, e.g. in the client web browser.

Figure 8:
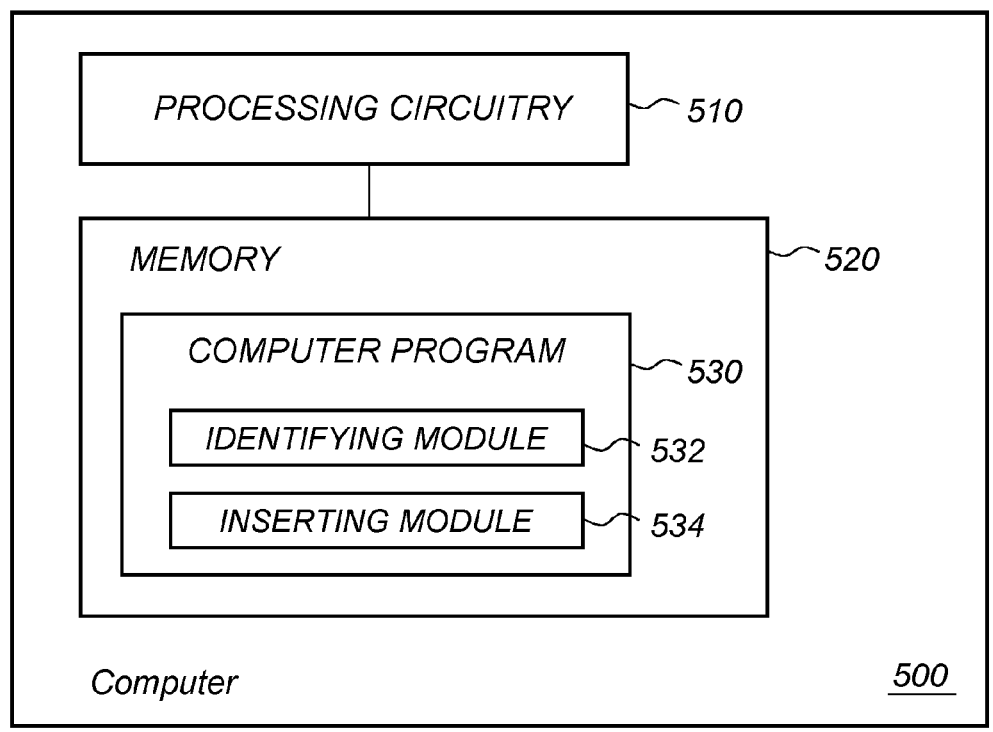
FIG. 8 is a schematic block diagram illustrating an example of a computer-implementation including a computer program according to an embodiment.

FIG. 8 is a schematic block diagram illustrating an example of a computer-implementation including a computer program according to an embodiment.

The computer 500 comprises processing circuitry 510 such as one or more processors and an associated memory 520. In this particular example, at least some of the steps, functions, procedures, modules and/or blocks described above are implemented in a computer program 530, which is loaded into the memory 520 for execution by the processing circuitry. The processing circuitry 510 and memory 520 are interconnected to each other to enable normal software execution. An optional input/output device (not shown) may also be interconnected to the processing circuitry 510 and/or the memory 520 to enable input and/or output of relevant information.

The term 'computer' should be interpreted in a general sense as any system or device capable of executing program code or computer program instructions to perform a particular processing, determining or computing task.

In a particular embodiment, the computer program 530 comprises program code 532 which, when executed by a computer, causes the computer to identify an executable script related to an advertisement, also referred to as an ad script, in the web page code corresponding to the web page. The program code 532 may be implemented as a module for identifying the ad script. The computer program 530 also comprises program code 534 which, when executed by a computer, causes the computer to insert an advertisement-delaying script-based executable patch in relation to the ad script to enable a delay of the download of objects related to the advertisement. The program code 534 may be implemented as a module for inserting the patch.

The program code may thus be organized as appropriate functional modules configured to perform, when executed by the processing circuit, at least part of the steps and/or tasks described above.

The computer 500 may therefore be regarded as an apparatus for handling advertisements when a web page is downloaded from a web site or a web portal in a communication network. The apparatus 500 comprises an identifying module 532 for identifying an executable script related to an advertisement, also referred to as an ad script, in the web page code corresponding to the web page. The apparatus 500 also comprises an inserting module 534 for inserting an advertisement-delaying script-based executable patch in relation to the ad script to enable a delay of the download of objects related to the advertisement.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD, storage device, a flash memory, or any other conventional memory device. The computer program may thus be loaded into the operating memory of a computer or equivalent processing device for execution by the processing circuitry thereof.

For example, the computer program stored in memory includes program instructions executable by the processing circuitry, whereby the processing circuitry is able or operative to execute the above-described steps, functions, procedure and/or blocks.

The computer or processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] US Patent Application 2009/0198580.
[2] 'Method and System for Performing On-The-Fly Manipulation of Advertisements Based on Analyzing Content of Internet Traffic', by IP.com Journal, August 2010.

The invention claimed is:

1. A method, performed by a proxy server of a communication network, wherein said method comprises the steps of:
  receiving, from a user equipment device of the communication network, a request to download a web page from one of a web site or a web portal of the communication network;
  responsive to receiving the request, obtaining web page code corresponding to said web page;
  responsive to obtaining the web page code, identifying an executable script of an ad script of an advertisement in the web page code corresponding to said web page;
  inserting, directly in the executable script of said ad script of the web page code, replacement functions that overwrite original built-in functions of the ad script, the replacement functions removing at least one Uniform Resource Locator (URL) of the original built-in functions of the ad script that would result in download of an object of the objects referenced in the ad script of said advertisement;
  inserting, at the end of executable script of said ad script, restoration functions that restore the original built-in functions of the ad script comprising said at least one URL after occurrence of a specific event within the web page code; and
  transmitting the modified web page code to the user equipment device to enable the user equipment device to delay download of objects referenced in the ad script of said advertisement during download of the content of the web page.

2. The method of claim 1, wherein the specific event comprises a time after at least part of the other content of the requested web page has been downloaded by the user equipment device.

3. The method of claim 2, wherein the specific event comprises a time after at least part of the requested web page content considered useful from a user viewing perspective of a user operating the user equipment device has been downloaded.

4. The method of claim 1, wherein said specific event is a 'load' event, or a customized event that is triggered when at least part of content considered useful from a user viewing perspective of a user operating the user equipment device has been downloaded.

5. The method of claim 1, wherein inserting the replacement functions comprises inserting the replacement functions at the beginning of said ad scrip; and
wherein inserting the restoration functions comprises inserting the restoration functions at the end of said ad script.

6. The method of claim 1, wherein at least one replacement function of the replacement functions that replaces an event subscription of an original built-in function of the original built-in functions of said ad script.

7. The method of claim 6, wherein the original built-in function of the original built-in functions is associated with the download of the object of the objects referenced in the ad script of said advertisement.

8. The method of claim 6, wherein the at least one replacement function of the replacement functions changes the event subscription from a 'DOMContentLoaded' event to an event after said 'DOMContentLoaded' event.

9. The method of claim 1, wherein said ad script and said replacement and restoration functions are based on a java programming language.

10. The method of claim 1, wherein the replacement functions overwrite the at least one Uniform Resource Locator (URL) of the original built-in functions with one of an empty image or empty iframe to replace the at least one Uniform Resource Locator (URL).

11. The method of claim 1, wherein the restoration functions overwrite the replacement functions with the original built-in functions comprising the URL of the original built-in functions of the ad script that would result in download of the object of the objects referenced in the ad script of said advertisement.

12. The method of claim 1, wherein the replacement functions overwrite an original document.write function of the ad script.

13. The method of claim 1, wherein the replacement functions overwrite an original document.addEventListener function of the ad script.

14. A proxy server of a communication network, the proxy server comprising:
hardware processing circuitry; and
memory coupled with the hardware processing circuitry, said memory comprising ad-handling logic that when executed by said hardware processing circuitry causes said hardware processing circuitry to operate to:
receive, from a user equipment device of the communication network, a request to download a web page from one of a web site or a web portal of the communication network;
in response to reception of the request, obtain web page code corresponding to said web page;
in response to obtaining the web page code, identify an executable script of an ad script of an advertisement in the web page code corresponding to said web page;
insert, directly in the executable script of said ad script of the web page code, replacement functions that overwrite original built-in functions of the ad script, the replacement functions removing at least one Uniform Resource Locator (URL) of the original built-in functions of the ad script that would result in download of an object of the objects referenced in the ad script of said advertisement; and
insert, at the end of executable script of said ad script, restoration functions that restore the original built-in functions of the ad script comprising said at least one URL after occurrence of a specific event within the web page code; and
communicate the modified web page code to the user equipment device to enable the user equipment device to delay download of objects referenced in the ad script of said advertisement during download of the content of the web page.

15. The proxy server of claim 14, wherein the restoration functions restore the original built-in functions of the ad script after the specific event has occurred at the user equipment device.

16. The proxy server of claim 14, wherein said hardware processing circuitry further operates to:
insert the replacement functions and definition of the replacement functions at the beginning of said ad script; and
insert the restoration functions at the end of said ad script.

17. The proxy server of claim 14, wherein said hardware processing circuitry further operates to insert the replacement functions to overwrite an event subscription of the original built-in functions of said ad script.

18. The proxy server of claim 14, wherein said hardware processing circuitry further operates to communicate with a web-browser of the user equipment operating in said communication network.

19. The proxy server of claim 14, wherein said hardware processing circuitry comprises a hardware processor, and said memory comprises instructions executable by said hardware processor.

20. A user equipment that communicates with a proxy server of a communication network, wherein said user equipment comprises:
hardware processing circuitry; and
memory, said memory comprising ad-handling logic that when executed by said hardware processing circuitry causes said hardware processing circuitry to operate to:
transmit a request to download a web page from one of a web site or a web portal of the communication network to the proxy server;
responsive to the transmission of the request, receive a modified web code of the requested web page from the proxy server that comprises replacement functions that overwrite original built-in functions of the ad script, the replacement functions removing at least one Uniform Resource Locator (URL) of the original built-in functions of the ad script that would result in download of an object of the objects referenced in the ad script of said advertisement, and that comprises restoration functions that restore the original built-in functions of the ad script comprising said at least one URL after occurrence of a specific event within the web page code; and
executing the advertisement-delaying script-based executable patch to delay the download of said objects referenced in the ad script of said advertisement.

21. The user equipment of claim 20, wherein said hardware processing circuitry comprises a hardware processor, and said memory comprises instructions executable by said hardware processor.

22. A proxy server of a communication network, wherein said proxy server comprises:

a hardware processor; and memory that comprises executable instructions that when executed by the hardware processor causes the hardware processor to operate to:

receive, from a user equipment device of the communication network, a request to download a web page from one of a web site or a web portal of the communication network;

in response to reception of the request, obtain web page code corresponding to said web page;

in response to obtaining the web page code, identify an executable script of an ad script of an advertisement in the web page code corresponding to said web page;

insert, directly in the executable script of said ad script of the web page code, replacement functions that overwrite original built-in functions of the ad script, the replacement functions removing at least one Uniform Resource Locator (URL) of the original built-in functions of the ad script that would result in download of an object of the objects referenced in the ad script of said advertisement; and insert, at the end of executable script of said ad script, restoration functions that restore the original built-in functions of the ad script comprising said at least one URL after occurrence of a specific event within the web page code; and transmit the modified web page code to the user equipment device to enable the user equipment device to delay download of objects referenced in the ad script of said advertisement during download of the content of the web page.

23. An apparatus that operates as a proxy server in a communication network, wherein said apparatus comprises:

a hardware processor: and memory that comprises executable instructions that when executed by the hardware processor cause the hardware processor to perform operations comprising:

receiving, from a user equipment device of the communication network, a request to download a web page from one of a web site or a web portal of the communication network;

responsive to receiving the request, obtaining web page code corresponding to said web page;

responsive to obtaining the web page code, identifying an executable script of an ad script of an advertisement in the web page code corresponding to said web page;

inserting, directly in the executable script of said ad script of the web page code, replacement functions that overwrite original built-in functions of the ad script, the replacement functions removing at least one Uniform Resource Locator (URL) of the original built-in functions of the ad script that would result in download of an object of the objects referenced in the ad script of said advertisement; and inserting, at the end of executable script of said ad script, restoration functions that restore the original built-in functions of the ad script comprising said at least one URL after occurrence of a specific event within the web page code; and transmitting the modified web page code to the user equipment device to enable the user equipment device to delay download of objects referenced in the ad script of said advertisement during download of the content of the web page.

24. A computer program product comprising a non-transitory computer readable storage medium storing:

program code which, when executed by a computer operating as a proxy server of a communication network, causes the computer to receive, from a user equipment device operating in the communication network, a request to download a web page from one of a web site or a web portal of the communication network;

program code which, when executed by the computer, causes the computer to obtain web page code corresponding to said web page;

program code which, when executed by the computer, causes the computer to identify an executable script of an ad script of an advertisement in the web page code corresponding to said web page; and program code which, when executed by the computer, causes the computer to insert, directly in the executable script of said ad script of the web page code, replacement functions that overwrite original built-in functions of the ad script, the replacement functions removing at least one Uniform Resource Locator (URL) of the original built-in functions of the ad script that would result in download of an object of the objects referenced in the ad script of said advertisement; and program code which, when executed by the computer, causes the computer to insert, at the end of executable script of said ad script, restoration functions that restore the original built-in functions of the ad script comprising said at least one URL after occurrence of a specific event within the web page code; and program code which, when executed by the computer, causes the computer to transmit the modified web page code to the user equipment device to enable the user equipment device to delay download of objects referenced in the ad script of said advertisement during download of the content of the web page.

* * * * *